US011814153B2

(12) United States Patent
Cravener et al.

(10) Patent No.: US 11,814,153 B2
(45) Date of Patent: Nov. 14, 2023

(54) PASSIVE PROPROTOR-BLADE RETENTION SYSTEMS

(71) Applicant: Bell Textron Inc., Fort Worth, TX (US)

(72) Inventors: Kyle Thomas Cravener, Arlington, TX (US); Andrew Maresh, Colleyville, TX (US); Jonathan Andrew Knoll, Alvarado, TX (US)

(73) Assignee: Textron Innovations Inc., Providence, RI (US)

( * ) Notice: Subject to any disclaimer, the term of this patent is extended or adjusted under 35 U.S.C. 154(b) by 128 days.

(21) Appl. No.: 17/552,052

(22) Filed: Dec. 15, 2021

(65) Prior Publication Data

US 2023/0182887 A1 Jun. 15, 2023

(51) Int. Cl.
*B64C 11/28* (2006.01)
*B64C 29/00* (2006.01)
*B64C 27/28* (2006.01)
*B64C 11/04* (2006.01)

(52) U.S. Cl.
CPC ............. *B64C 11/28* (2013.01); *B64C 11/04* (2013.01); *B64C 27/28* (2013.01); *B64C 29/0033* (2013.01)

(58) Field of Classification Search
None
See application file for complete search history.

(56) References Cited

U.S. PATENT DOCUMENTS

| 9,421,673 | B2* | 8/2016 | Dunmire | B64C 27/50 |
|---|---|---|---|---|
| 9,463,541 | B2* | 10/2016 | Sherrill | B23Q 3/082 |
| 10,648,519 | B2* | 5/2020 | Przybyla | B64C 27/30 |
| 10,710,712 | B2 | 7/2020 | McIntyre et al. | |
| 10,843,798 | B2* | 11/2020 | Przybyla | B64C 11/28 |
| 2010/0072325 | A1* | 3/2010 | Sambell | B64C 11/28 244/7 A |
| 2012/0292456 | A1* | 11/2012 | Hollimon | B64C 27/28 416/142 |
| 2021/0078695 | A1 | 3/2021 | Foskey et al. | |
| 2021/0094683 | A1 | 4/2021 | Foskey | |

* cited by examiner

*Primary Examiner* — Kayla McCaffrey
(74) *Attorney, Agent, or Firm* — Bradley Arant Boult Cummings LLP

(57) ABSTRACT

A system for retaining a folded proprotor blade in flight. The system includes a mounting plate, a first arm coupled to the mounting plate at an acute angle relative to the mounting plate, and a first deformable pad affixed to the first arm and adapted to contact the folded proprotor blade.

20 Claims, 9 Drawing Sheets

PASSIVE PROPROTOR-BLADE RETENTION SYSTEMS

TECHNICAL FIELD

The present disclosure relates generally to mechanisms for passive proprotor blade retention and more particularly, but not by way of limitation, to mechanisms for passively retaining folded proprotor blades in a vertical take-off and landing ("VTOL") aircraft during flight.

BACKGROUND

This section provides background information to facilitate a better understanding of the various aspects of the disclosure. It should be understood that the statements in this section of this document are to be read in this light and not as admissions of prior art.

Some VTOL aircraft include proprotor blades that can be folded to be oriented substantially parallel to pylon assemblies to minimize drag during some flight modes. In such aircraft, the proprotor blades may have a tendency to bend or deflect due to aerodynamic forces and aircraft maneuvering-induced forces. Bending and deflections in the proprotor blades can cause excess loading, for example, within a pitch-locking mechanism.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A system for retaining a folded proprotor blade in flight. The system includes a mounting plate, a first arm coupled to the mounting plate at an acute angle relative to the mounting plate, and a first deformable pad affixed to the first arm and adapted to contact the folded proprotor blade.

A system for retaining a folded proprotor blade in flight. The system includes a mounting plate, a first pair of opposing arms coupled to the mounting plate, and a deformable roller rotatably coupled to each of the first pair of opposing arms and adapted to rollably contact the folded proprotor blade.

A system for retaining a folded proprotor blade in flight. The system includes a mounting plate, a first arm coupled to the mounting plate at a first acute angle relative to the mounting plate, a second arm coupled to the mounting plate at a second acute angle relative to the mounting plate, a first deformable pad affixed to the first arm and adapted to contact a first side of the folded proprotor blade, and a second deformable pad affixed to the second arm and adapted to contact a second side of the folded proprotor blade. The first side and the second side are on opposite sides of the proprotor blade in a beamwise direction.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1A:
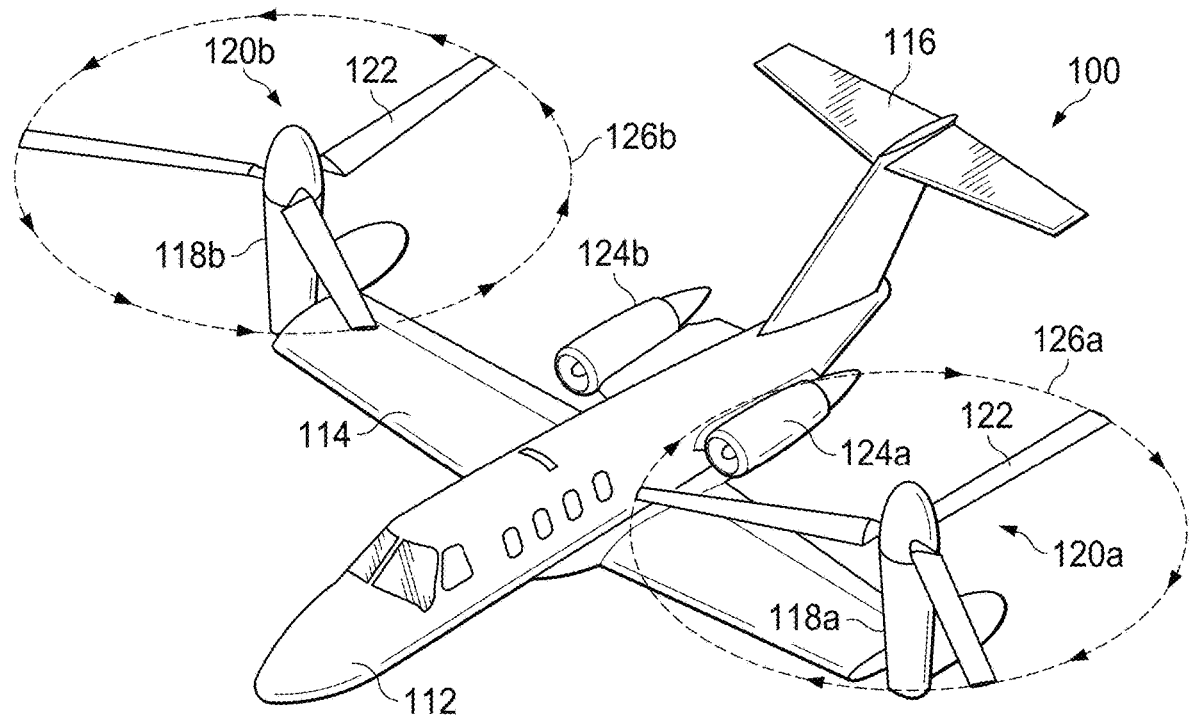
FIGS. 1A-1D illustrate a tiltrotor aircraft 100.
Figure 1B:
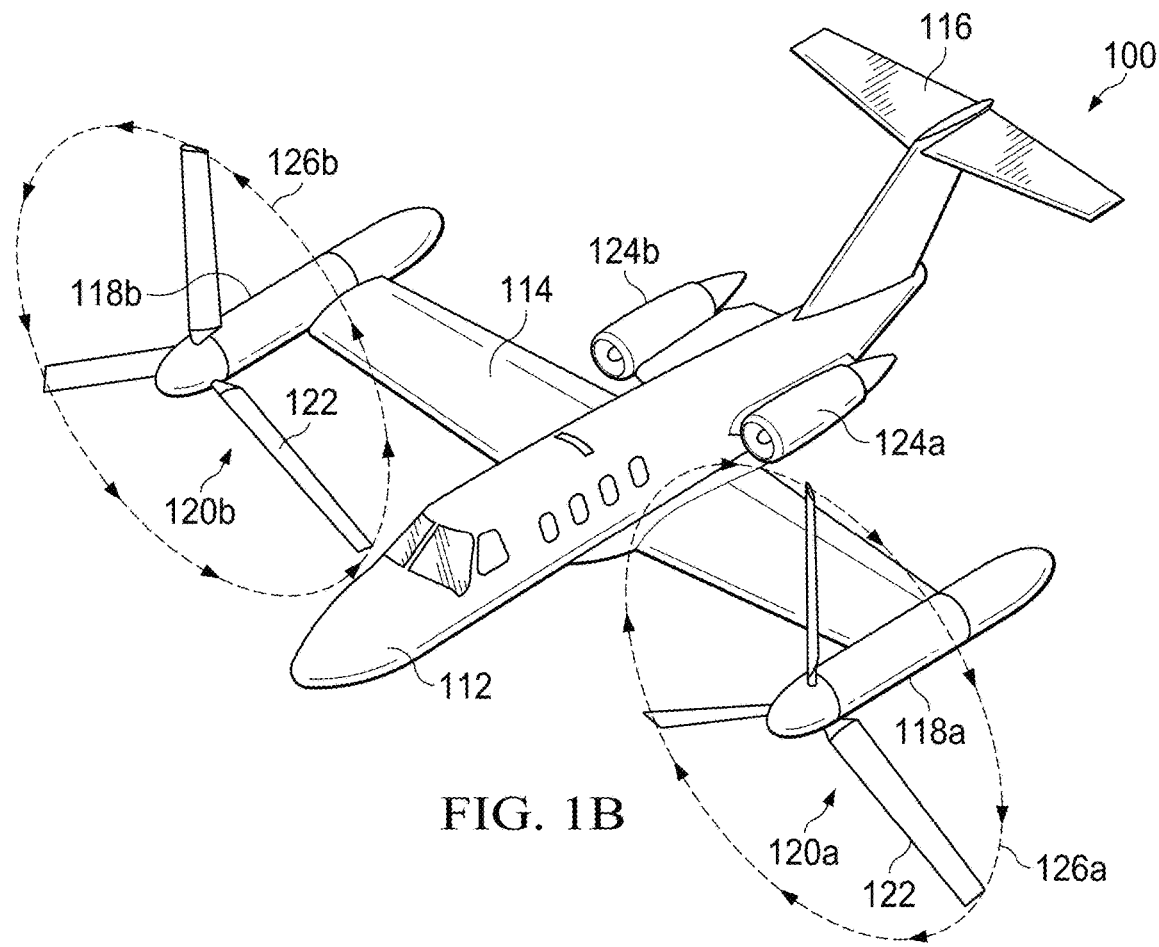
Figure 1C:
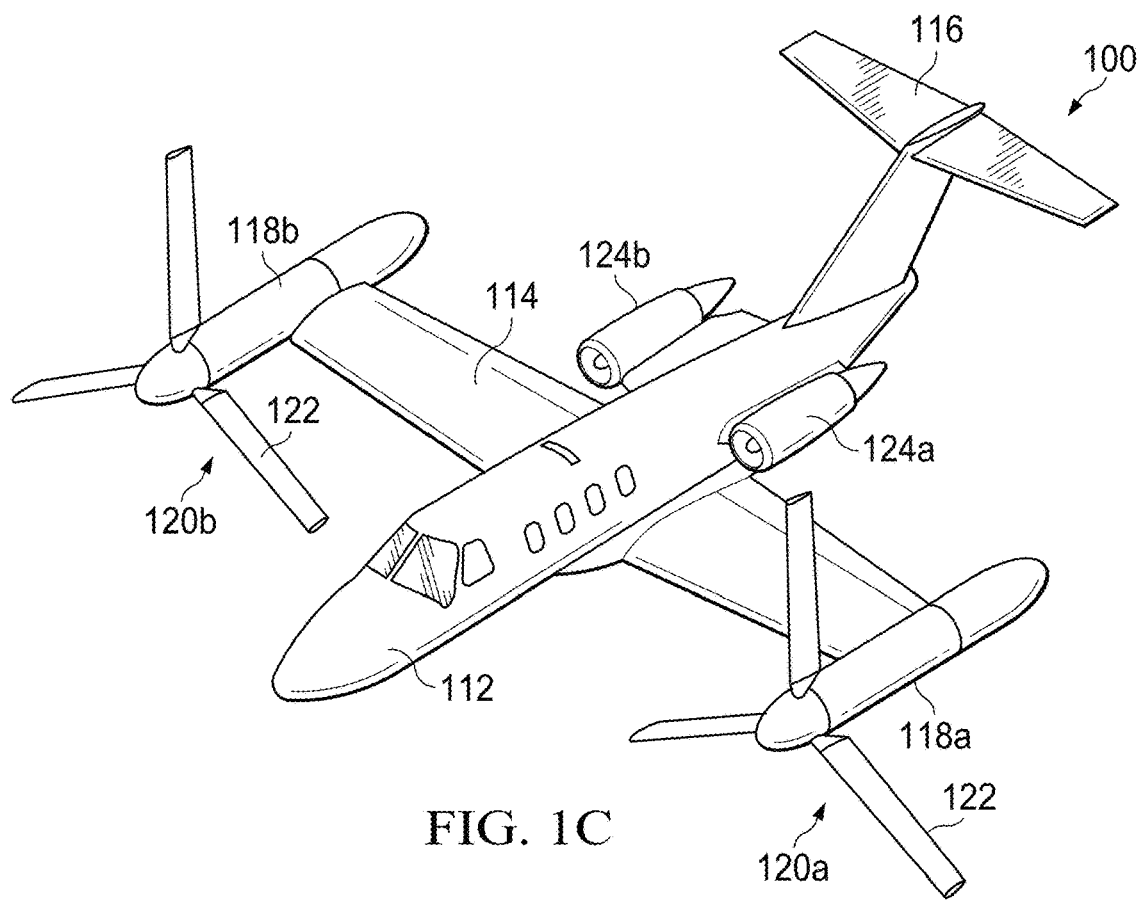
Figure 1D:
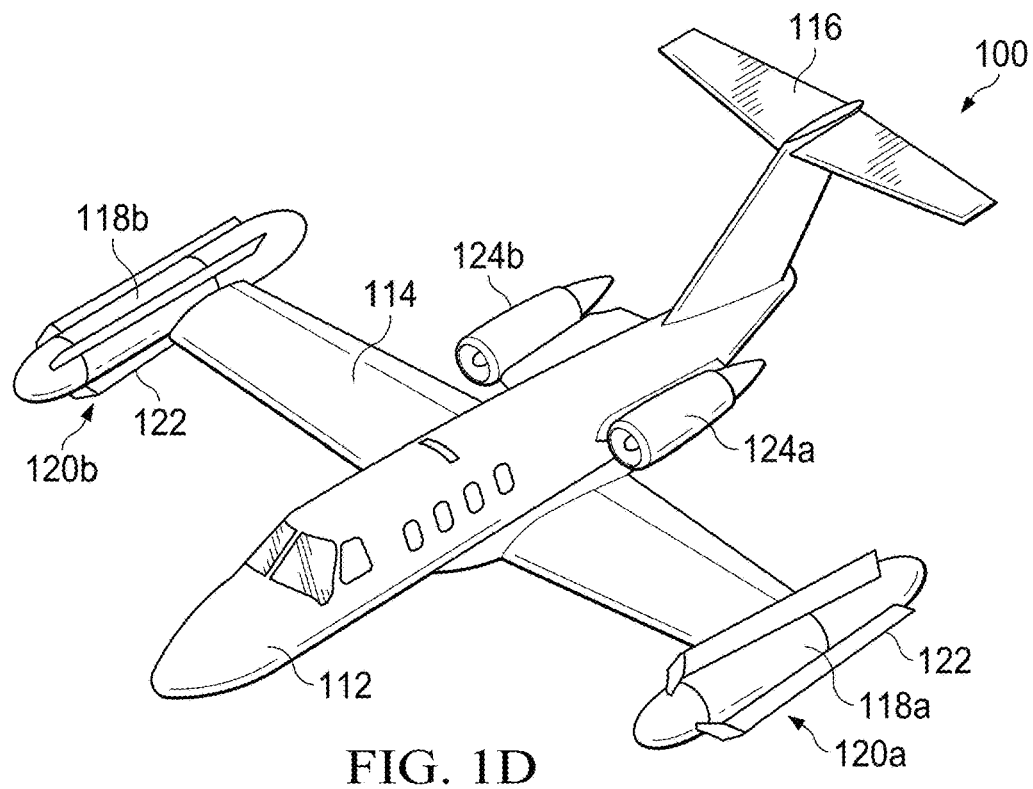

FIGS. 1A-1D illustrate a tiltrotor aircraft 100. The tiltrotor aircraft 100 includes a fuselage 112, a wing 114, and a tail assembly 116 including control surfaces operable for horizontal and/or vertical stabilization during forward flight. Located proximate outboard ends of the wing 114 are pylon assemblies (i.e., nacelles) 118a, 118b that are rotatable relative to the wing 114 between a generally vertical orientation, as best seen in FIG. 1A, and a generally horizontal orientation, as best seen in FIGS. 1B-1D. The pylon assemblies 118a, 118b each house a portion of a drive system used to rotate proprotor assemblies 120a and 120b, respectively. Each of the proprotor assemblies 120a and 120b includes a plurality of proprotor blades 122 operable to be rotated, as best seen in FIGS. 1A-1B, operable to be feathered, as best seen in FIG. 1C and operable to be folded, as best seen in FIG. 1D. In the illustrated embodiment, the proprotor assembly 120a is rotated responsive to torque and rotational energy provided by the engine 124a and the proprotor assembly 120b is rotated responsive to torque and rotational energy provided by the engine 124b. The engines 124a and 124b are located proximate an aft portion of the fuselage 112. The engines 124a and 124b are operable in a turboshaft mode, as best seen in FIGS. 1A-1B and a turbofan mode, as best seen in FIGS. 1C-1D.

FIG. 1A illustrates the tiltrotor aircraft 100 in VTOL or helicopter flight mode, in which proprotor assemblies 120a and 120b rotate in a substantially horizontal plane to provide a lifting thrust, such that the tiltrotor aircraft 100 flies much like a conventional helicopter. In this configuration, the engines 124a and 124b are operable in turboshaft mode, in which hot combustion gases in each of the engines 124a and 124b cause rotation of a power turbine coupled to an output shaft used to power the drive system coupled to the respective proprotor assemblies 120a and 120b. Thus, in this configuration, the tiltrotor aircraft 100 is considered to be in a rotary flight mode. FIG. 1B illustrates the tiltrotor aircraft 100 in proprotor forward flight mode, in which the proprotor assemblies 120a and 120b rotate in a substantially vertical plane to provide a forward thrust enabling the wing 114 to provide a lifting force responsive to forward airspeed, such that the tiltrotor aircraft 100 flies much like a conventional propeller-driven aircraft. In this configuration, the engines 124a and 124b are operable in the turboshaft mode and the tiltrotor aircraft 100 is considered to be in the rotary flight mode.

In the rotary flight mode of the tiltrotor aircraft 100, proprotor assemblies 120a, 120b rotate in opposite directions to provide torque balancing to the tiltrotor aircraft 100. For example, when viewed from the front of the tiltrotor aircraft 100 in proprotor forward flight mode (FIG. 1B) or from the top in helicopter mode (FIG. 1A), proprotor assembly 120a rotates clockwise, as indicated by motion arrows 126a, and proprotor assembly 120b rotates counterclockwise, as indicated by motion arrows 126b. In the illustrated embodiment, proprotor assemblies 120a, 120b each include three proprotor blades 122 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that the tiltrotor aircraft 100 can be operated such that proprotor assemblies 120a, 120b are selectively positioned between proprotor forward flight mode and helicopter mode, which can be referred to as a conversion flight mode.

FIG. 1C illustrates the tiltrotor aircraft 100 in transition between proprotor forward-flight mode and airplane forward-flight mode, in which the engines 124a and 124b have been disengaged from the proprotor assemblies 120a and 120b and proprotor blades 122 of the proprotor assemblies 120a and 120b have been feathered, or oriented to be streamlined in the direction of flight, such that the proprotor blades 122 act as brakes to aerodynamically stop the rotation of the proprotor assemblies 120a and 120b. In this configuration, the engines 124a and 124b are operable in turbofan mode wherein hot combustion gases in each of the engines 124a and 124b cause rotation of a power turbine coupled to an output shaft used to power a turbofan that forces bypass air through a fan duct to create forward thrust enabling the wing 114 to provide a lifting force responsive to forward airspeed, such that the tiltrotor aircraft 100 flies much like a conventional jet aircraft. Thus, in this configuration, the tiltrotor aircraft 100 is considered to be in a non-rotary flight mode. FIG. 1D illustrates the tiltrotor aircraft 100 in airplane forward-flight mode, in which the proprotor blades 122 of the proprotor assemblies 120a, 120b have been folded to be oriented substantially parallel to the respective pylon assemblies 118a and 118b to minimize the drag force generated by the proprotor blades 122. In this configuration, the engines 124a and 124b are operable in the turbofan mode and the tiltrotor aircraft 100 is considered to be in the non-rotary flight mode. The forward cruising speed of the tiltrotor aircraft 100 can be significantly greater in airplane forward-flight mode versus proprotor forward-flight mode as the forward airspeed-induced proprotor aeroelastic instability is overcome.

Even though the tiltrotor aircraft 100 has been described as having two engines fixed to the fuselage, each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even through the proprotor assemblies 120a and 120b are illustrated in the context of the tiltrotor aircraft 100, it should be understood by those having ordinary skill in the art that the proprotor assemblies disclosed herein can be implemented on other tiltrotor aircraft including, for example, quad tiltrotor aircraft having an additional wing member aft of wing 114, unmanned tiltrotor aircraft or other tiltrotor aircraft configurations.

When the proprotor blades 122 have been folded to be oriented substantially parallel to the respective pylon assemblies 118a and 118b to minimize drag, the proprotor blades in some cases may have a tendency to bend or deflect due to aerodynamic forces and aircraft maneuvering-induced forces. Bending and deflections in the proprotor blades 122 can cause excess loading, for example, within a pitch-locking mechanism.

It would therefore be advantageous to be able to hold the proprotor blades 122 steady during flight when in a folded position in order to reduce loads due to bending or deflection of the proprotor blades 122. Various embodiments disclosed herein hold the proprotor blades in place in a chordwise and a beamwise direction and are passive, which permits a simpler and lighter-weight design relative to earlier solutions.

Figure 2:
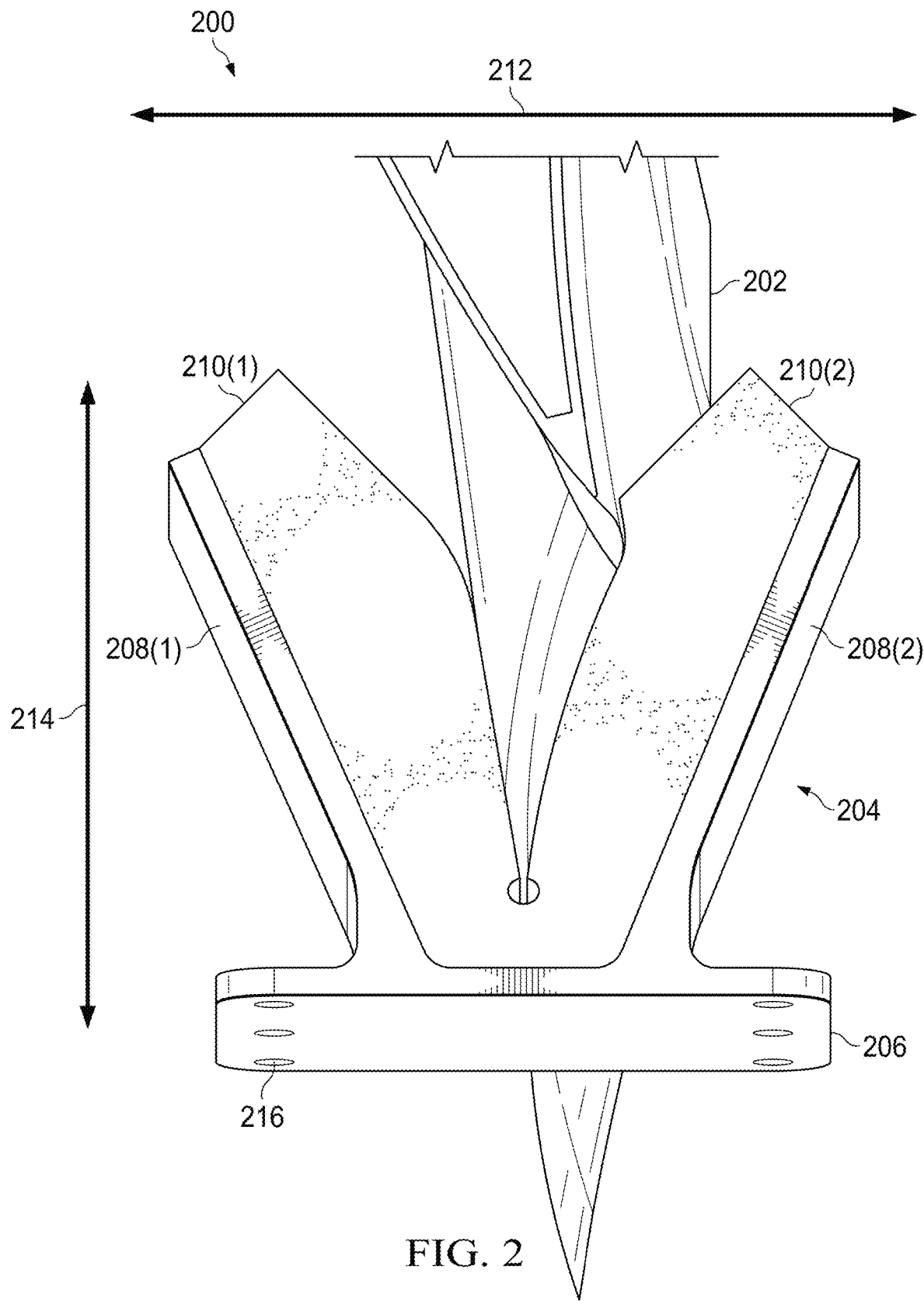
FIG. 2 is a front perspective view of a proprotor blade-retention mechanism and a proprotor blade associated therewith.

FIG. 2 is a front perspective view of a proprotor blade-retention mechanism and a proprotor blade associated therewith. In FIG. 2, the proprotor blade-retention mechanism and the proprotor blade associated therewith are generally designated with reference numeral 200. The assembly 200 includes a proprotor blade 202 shown in part and a proprotor blade-retention mechanism 204, which is illustrated as having a general V-block shape. The front perspective view of FIG. 2 is from a root end of the proprotor blade 202.

The proprotor blade-retention mechanism 204 includes a mounting plate 206. Angled arms 208(1) and 208(2) extend at acute angles from the mounting plate 206 and are illustrated as being substantially mirror images of one another about an axis extending perpendicular to the mounting plate 206. The proprotor blade-retention mechanism 204 also includes deformable pads 210(1) and 210(2) affixed to facing surfaces of the respective angled arms 208(1) and 208(2) so as to form a generally V-shaped cradle within which a trailing edge of the proprotor blade 202 is guided during at least part of a folding operation and is retained when the proprotor blade 202 is in a folded position. Arrow 212 illustrates a beamwise direction of the proprotor blade 202, while arrow 214 illustrates a chordwise direction of the proprotor blade 202. Mounting holes 216 in the mounting plate 206 are also shown.

In a typical embodiment, the proprotor blade-retention mechanism 204 is gentle on the proprotor blade 202 and still serves to hold the proprotor blade 202 in place when in a folded position. The proprotor blade-retention mechanism 204 serves to arrest the proprotor blade 202 primarily in the beamwise direction 212 as the proprotor blade 202 folds in the chordwise direction 214. In some embodiments, pre-loading could be employed by the proprotor blade-retention mechanism 204 in order to apply pressure to hold the proprotor blade 202 in place.

The deformable pads 210(1) and 210(2) can include various materials in accordance with design considerations. For example, one or more of TEFLON, foam rubber, open-cell or closed-cell foam, rubber, and NEOPRENE, with or without various coatings, could be utilized to achieve desired characteristics for retention of the proprotor blade 202. Relatively high or low friction layers could be used as desired. Those having skill in the art will also appreciate that the illustrative dimensions shown in FIG. 2 are for exemplary purposes only and are not intended to be limiting.

In addition, variable positioning of the proprotor blade-retention mechanism 204 along a spanwise direction of the proprotor blades 202 can be employed. Positioning closer to a root end of the proprotor blade 202 will, all other factors being equal, result in less deflection of the proprotor blade 202 when in a folded position. Moreover, various embodiments could employ one or more proprotor blade-retention mechanisms 204 of identical or varying dimensions along a span length of the proprotor blade 202.

For example, the proprotor blade retention mechanism 204 could be moved inboard relative to the proprotor blade 202 in order that a smaller mechanism could accommodate proprotor blade deflections when the proprotor blade is inserting inside the proprotor blade-retention mechanism. However, such an approach could increase loading. Conversely, loading could be reduced when positioning the proprotor blade-retention mechanism 204 farther outboard relative to the proprotor blade; however, a V-shaped opening would likely need to be wider and larger, which would likely result in greater aerodynamic drag.

Figure 3:
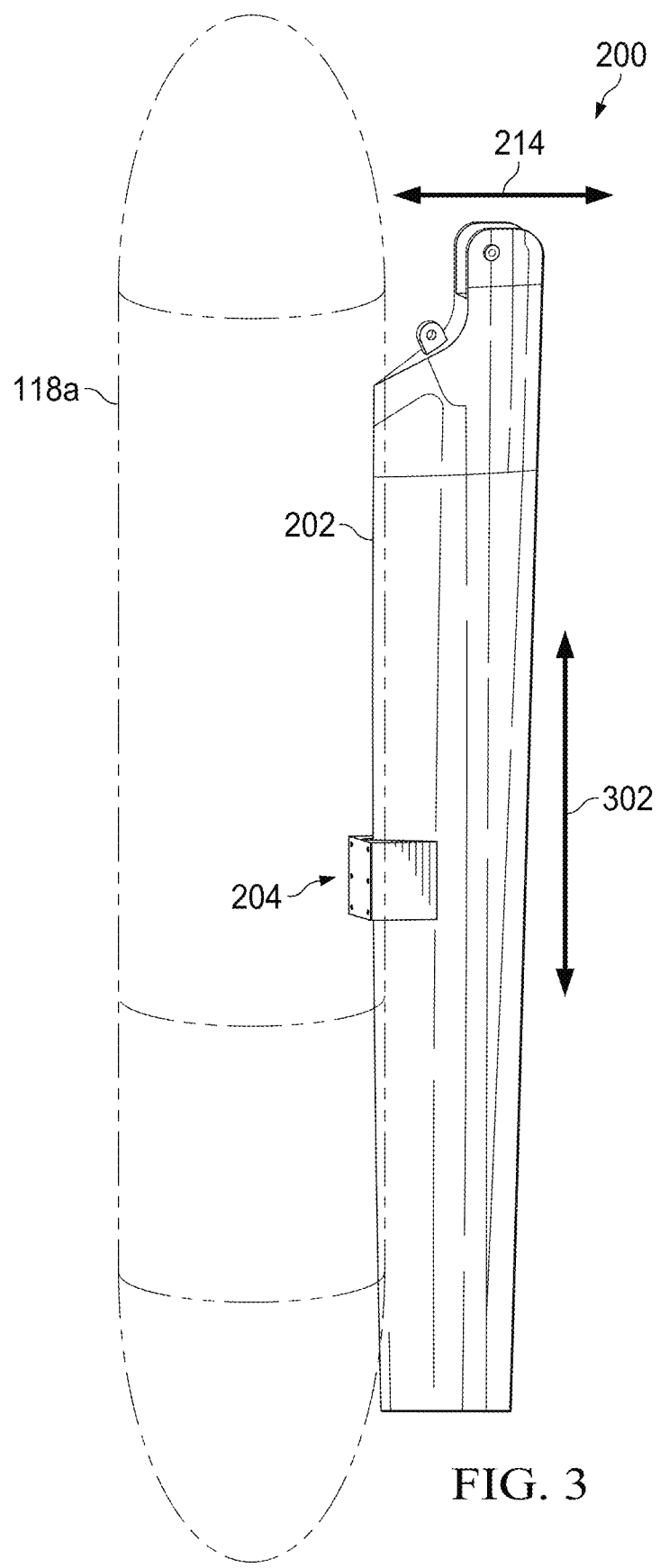
FIG. 3 is a side perspective view of the assembly 200 of FIG. 2.

FIG. 3 is a side perspective view of the assembly 200 of FIG. 2. In FIG. 3, the proprotor blade-retention mechanism 204 is shown retaining a trailing edge of the proprotor blade 202 when the proprotor blade 202 is in a folded position relative to the pylon assembly 118a shown in outline, neither of which is necessarily drawn to scale. In similar fashion to FIG. 2, arrow 302 illustrates a spanwise direction of the proprotor blade 202.

Figure 4A:
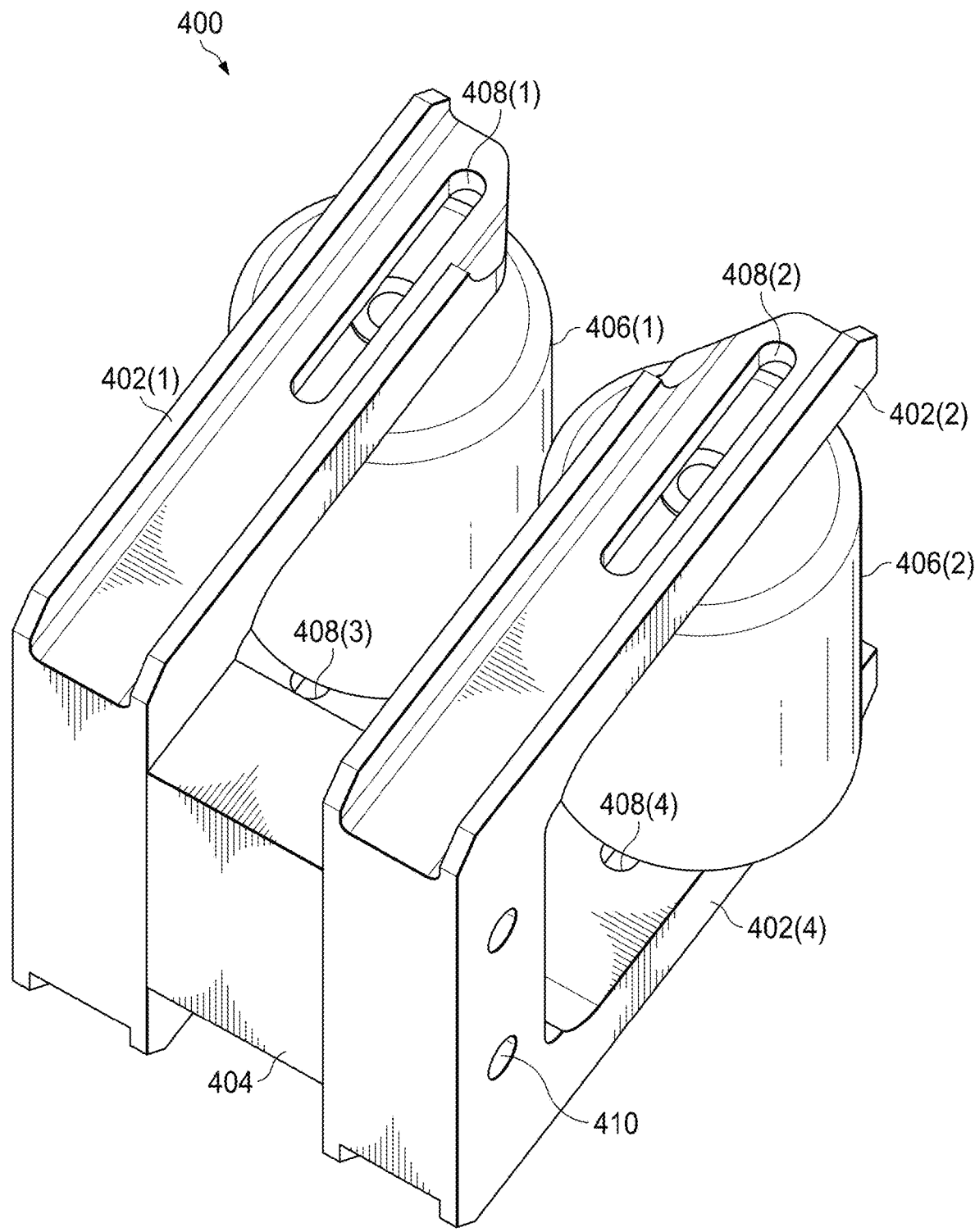
FIGS. 4A-B are perspective views of a proprotor blade-retention mechanism.
Figure 4B:
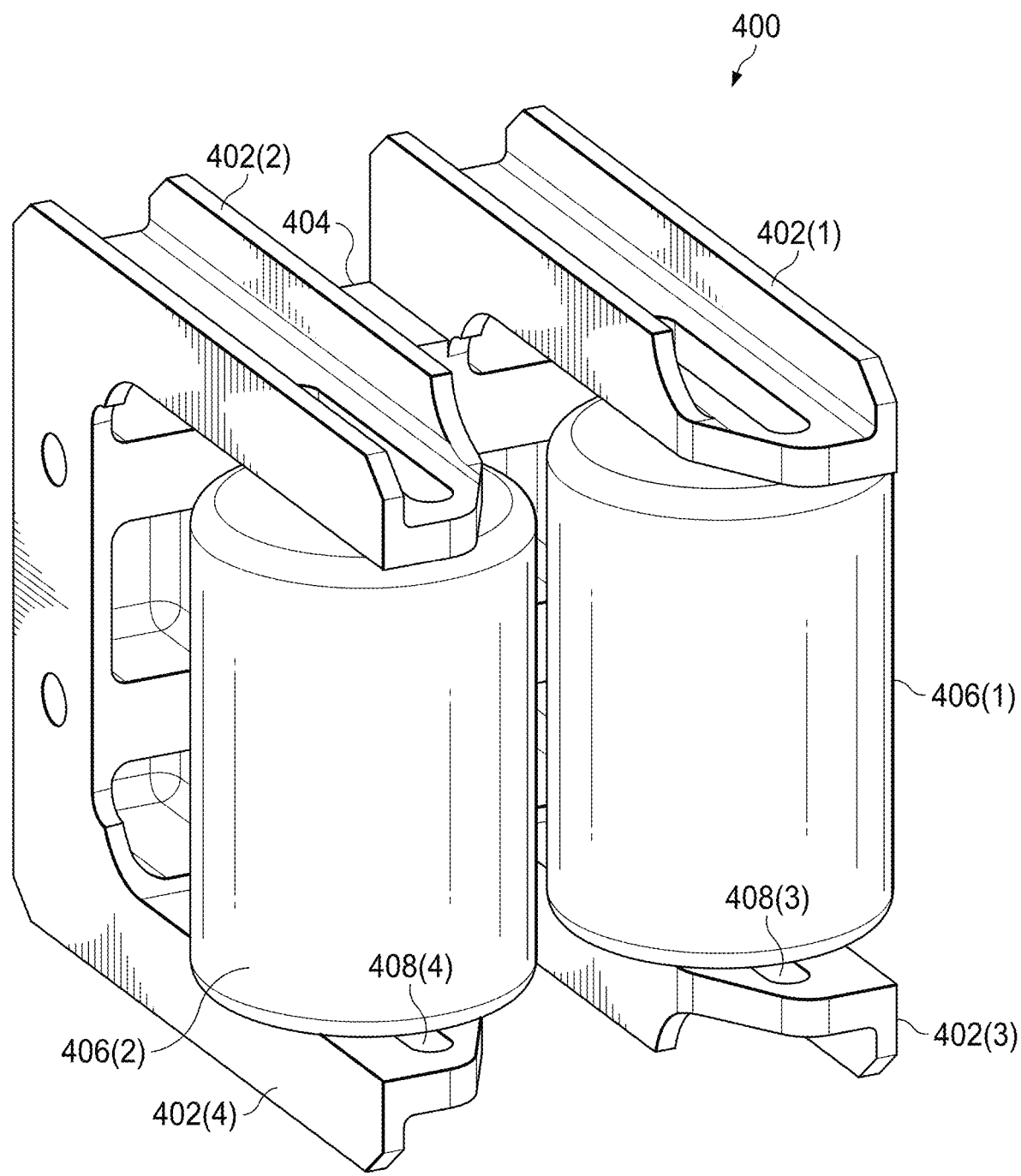

FIGS. 4A-B are perspective views of a proprotor blade-retention mechanism. A proprotor blade-retention mechanism 400 is illustrated in a top perspective view in FIG. 4A and in a front perspective view in FIG. 4B. The proprotor blade-retention mechanism 400 includes four arms 402(1), 402(2), 402(3), and 402(4). A mounting plate 404 interconnects the arms 402(1)-(4) to one another as shown in FIGS. 4A-B such that the arms 402(1)-(4) are parallel to one another, although such a parallel arrangement need not necessarily be employed.

The proprotor blade-retention mechanism 400 also includes two rollers 406(1) and 406(2) generally oriented parallel to one another, the roller 406(1) being rotatably mounted between the arm 402(1) and the arm 402(3) and the roller 406(2) being rotatably mounted between the arm 402(2) and the arm 402(4). Also illustrated are adjustment slots 408(1)-(4), each of which is formed in a respective one of the arms 402(1)-(4) and permits adjustment of the rollers 406(1) and 406(2) in a chordwise direction of a proprotor blade to be retained by the proprotor blade-retention mechanism 400. Also illustrated are a plurality of mounting holes 410 in the mounting plate 404.

As discussed above relative to the deformable pads 210 (1)-(2), various materials can be utilized for the rollers 406(1) and 406(2) to achieve desired characteristics such as deformability and frictional properties of the rollers 406(1)-(2). Moreover, the amount of force required to rotate the rollers 406(1) and 406(2) can be varied in accordance with design considerations. In some embodiments, a lock mechanism can be employed in order to prevent a proprotor blade being retained from progressing too far into the proprotor blade-retention mechanism 400 in a folded position. In addition, the mounting plate 404 can be designed so as to provide spring loading in order to assist in retention of a proprotor blade. The rollers 406(1)-(2) could also be designed to be flexible in order to provide a spring-loading effect on a proprotor blade being retained.

Also shown in FIGS. 4A-B are tapered surfaces on leading edges of each of the arms 402(1)-(4), which tapered surfaces serve to minimize damage to a proprotor blade during a folding operation in the event the proprotor blade were to strike one or more of the arms 402(1)-(4) due, for example, to misalignment of the proprotor blade and the proprotor blade-retention mechanism 400. Moreover, in some embodiments a deformable ledge, either preloaded or not, could be utilized adjacent to an interior surface of the mounting plate 404 and against which a trailing edge of a proper blade could rest when a proprotor blade is in a folded position.

Figure 5:
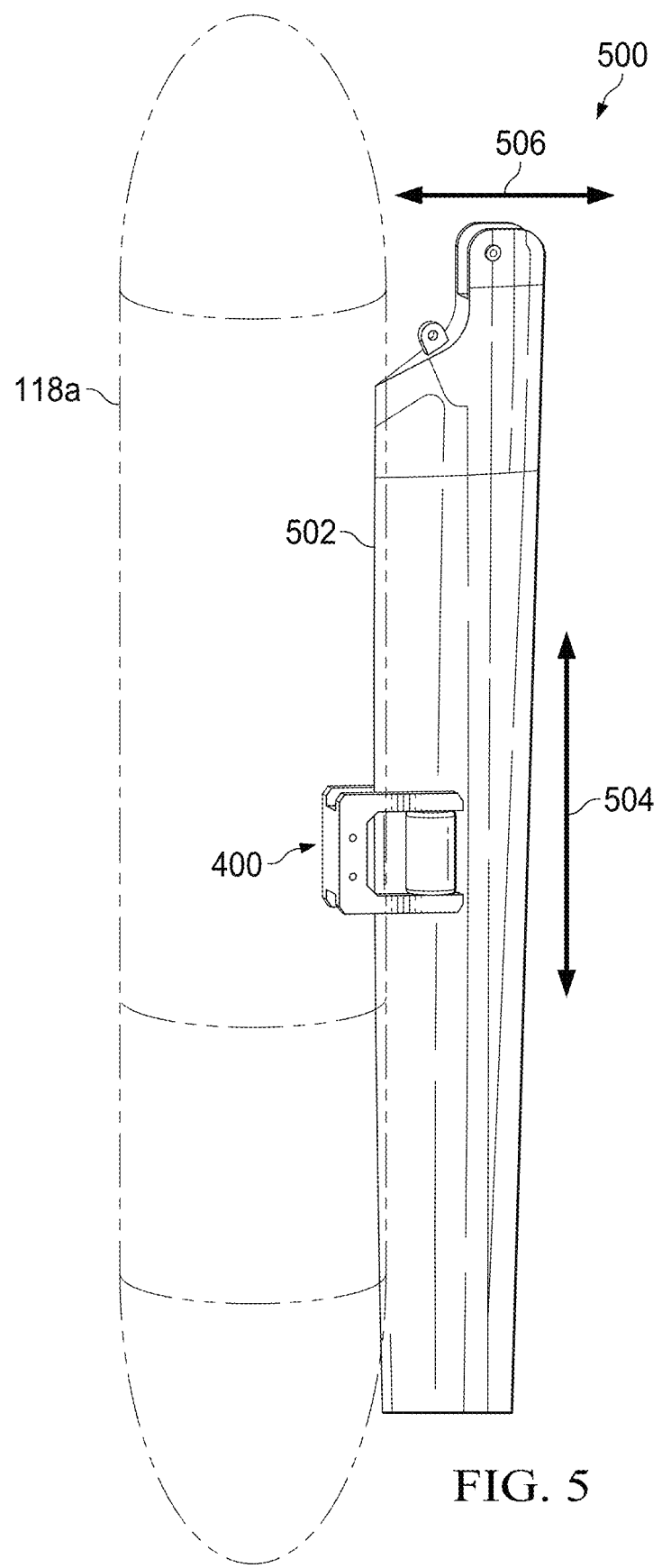
FIG. 5 is a side perspective view of the proprotor blade-retention mechanism of FIGS. 4A-B and a proprotor blade associated therewith.

FIG. 5 is a side perspective view of the proprotor blade-retention mechanism 400 and a proprotor blade 502 associated therewith. In FIG. 5, the proprotor blade-retention mechanism 400 is shown retaining a trailing edge of the proprotor blade 502 when the proprotor blade 502 is in a folded position relative to the pylon assembly 118a shown in outline, neither of which is necessarily drawn to scale. Arrow 504 illustrates a spanwise direction of the proprotor blade 502. Arrow 506 illustrates a chordwise direction of the proprotor blade 502.

Figure 6A:
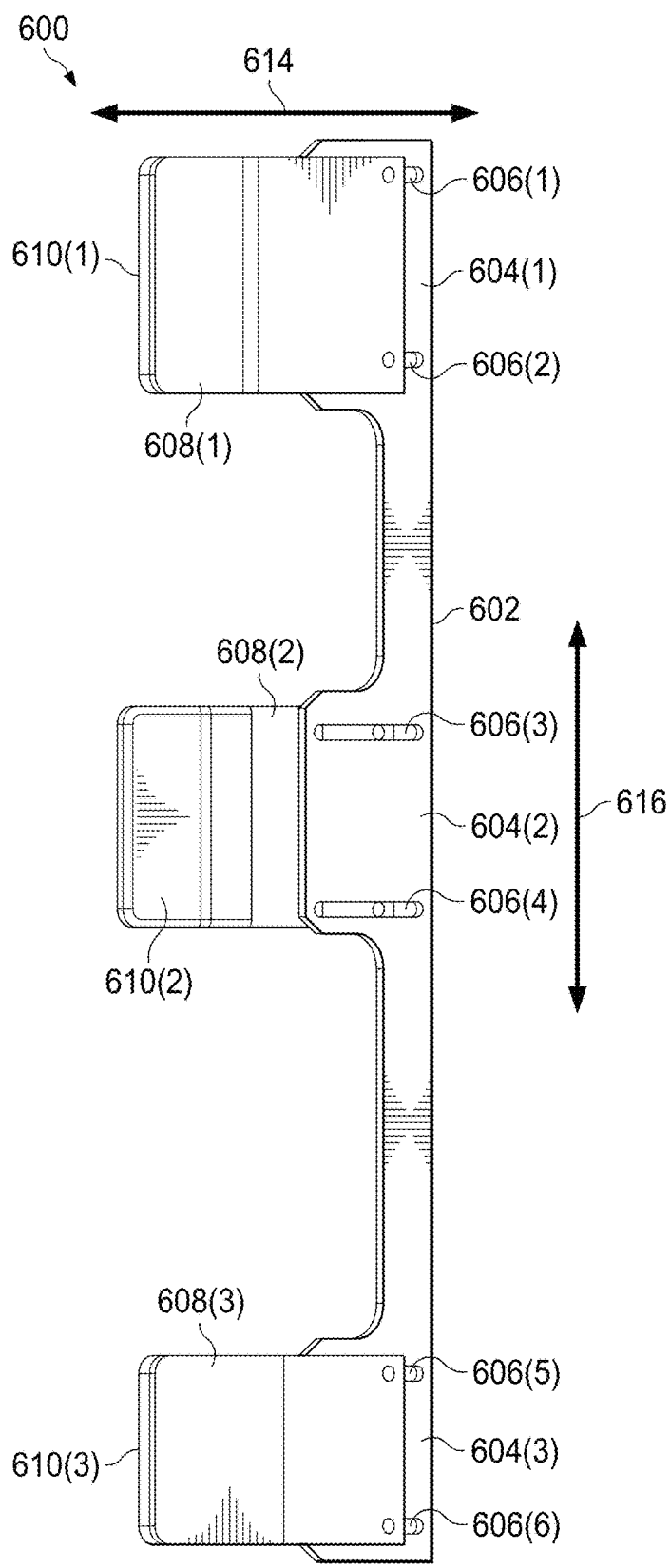
FIGS. 6A-B are side and front perspective views of a proprotor blade-retention mechanism.
Figure 6B:
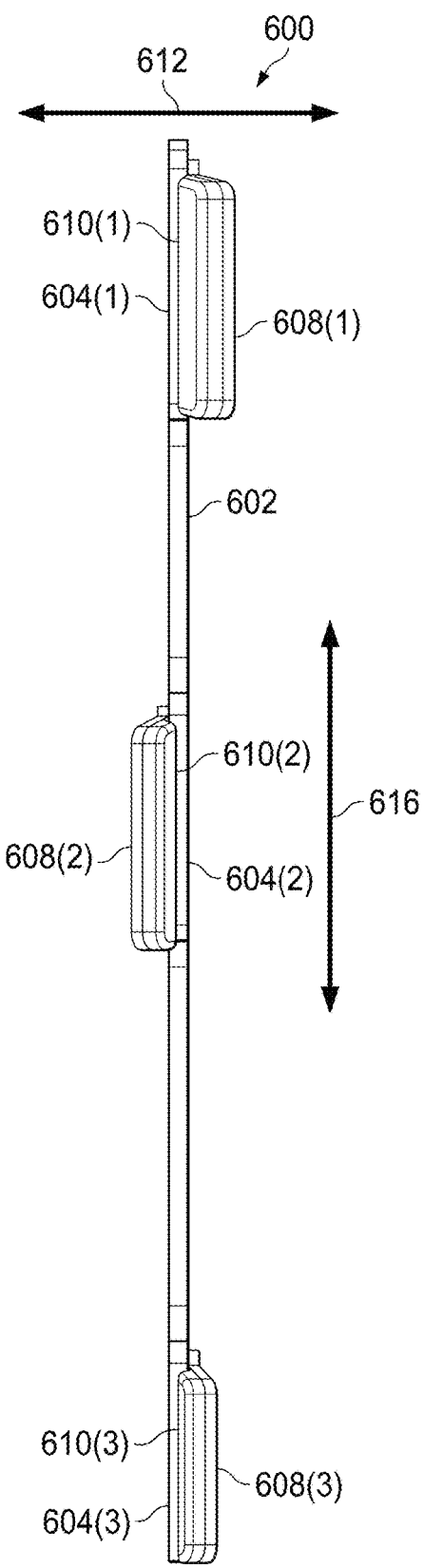

FIGS. 6A-B are side and front perspective views of a proprotor blade-retention mechanism. In FIGS. 6A-6B, a proprotor blade-retention mechanism 600 is shown, FIG. 6A illustrating the proprotor blade-retention mechanism 600 in a side perspective view and FIG. 6B illustrating the proprotor blade-retention mechanism 600 in a front perspective view. Arrow 612 illustrates a beamwise direction, arrow 614 illustrates a chordwise direction, and arrow 616 illustrates a spanwise direction of a proprotor blade to be retained by the proprotor blade-retention mechanism 600.

The proprotor blade-retention mechanism 600 includes a mounting plate 602. The mounting plate 602 is elongated and includes a plurality of arm-mounting regions, three such arm-mounting regions 604(1)-(3) being illustrated in each of FIGS. 6A and 6B. As shown in FIGS. 6A and 6B, the arm-mounting regions 604(1)-(3) are arranged in series along the spanwise direction 616. Each of the arm-mounting regions 604(1)-(3) includes a pair of adjustable slots that permit angled arms 608(1)-(3) to be adjusted in a chordwise direction to mate with a proprotor blade to be retained by the proprotor blade-retention mechanism 600. The adjustable slots are shown and designated by reference numerals 606 (1)-(6). Each of the angled arms 608(1)-(3) is associated with a respective deformable pad, deformable pads 610(1)-(3) being illustrated in each of FIGS. 6A and 6B.

Because each of the angled arms 608(1)-(3) is offset in the spanwise direction 616 relative to others of the angled arms 608 (1)-(3) and alternates in the beamwise direction 612 relative to successive immediately adjacent ones of the angle arms 608(1)-(3), it is possible to reduce an angle of an angled arm 608 relative to a V-block angled arm. This is because the angled arms 608(1)-(3) only need to interface with a proprotor blade on a single side at a time; as such, angular tolerances due, for example, to blade twist at a particular position along the spanwise direction 616 of the proprotor beam do not need to be as great as would be necessary if a V-block proprotor blade-retention mechanism were used.

Moreover, use of multiple successive angled arms such as the angled arms 608(1)-(3) permits proprotor-blade deflection to be progressively limited from root to tip along the span of the proprotor blade. Those having skill in the art will appreciate that, in some embodiments, the proprotor blade-retention mechanism 600 facilitates retention of a proprotor blade because only a single side of the proprotor blade is retained by each of the angled arms 608(1)-(3), in contrast to a V-block proprotor blade-retention mechanism. In some situations, less aerodynamic drag results relative to other passive proprotor blade-retention mechanisms.

In some embodiments, the deformable pads disclosed above are contoured in order to more particularly mate with a particular portion of a proper blade is designed such that twist of the proprotor blade at a particular position along a span of the proprotor blade is accounted for. As discussed above, various different materials can be utilized for the deformable pads 610 (1)-(3) in accordance with design constraints. For example, different materials could be utilized in order to achieve particular friction design criteria.

Figure 7:
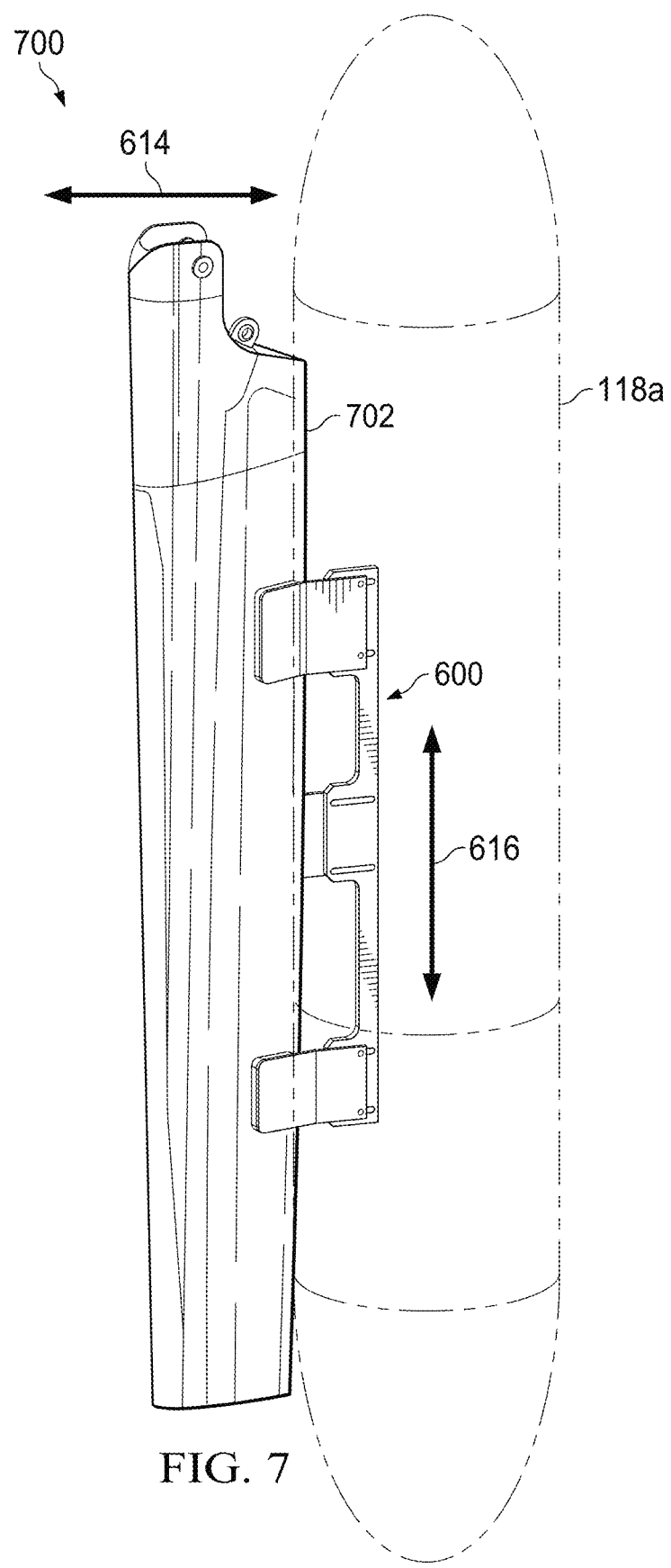
FIG. 7 is a side perspective view of the proprotor blade-retention mechanism 600 and a proprotor blade 702 associated therewith.

FIG. 7 is a side perspective view of the proprotor blade-retention mechanism 600 and a proprotor blade 702 associated therewith. In FIG. 7, the proprotor blade-retention mechanism 600 is shown retaining a trailing edge of the proprotor blade 702 when the proprotor blade 702 is in a folded position relative to the pylon assembly 118*a* shown in outline, neither of which is necessarily drawn to scale. As shown in FIG. 7, each of the angled arms 604(1)-(3) is positioned on an opposite sides of the proprotor blade 702 relative to successive ones of the angled arms 604(1)-(3).

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for retaining a folded proprotor blade in flight, the system comprising:
   a mounting plate;
   a first arm coupled to the mounting plate at an acute angle relative to the mounting plate; and
   a first deformable pad affixed to the first arm and adapted to contact the folded proprotor blade.

2. The system of claim 1, wherein the first deformable pad is preloaded to facilitate proprotor blade retention.

3. The system of claim 1, wherein the first deformable pad is contoured to mate with the folded proprotor blade.

4. The system of claim 1, wherein the first deformable pad comprises at least one of TEFLON, open-cell foam, closed-cell foam, rubber, and NEOPRENE.

5. The system of claim 1, comprising a second arm positioned opposite the first arm in a beamwise direction and coupled to the mounting plate at an acute angle relative to the mounting plate.

6. The system of claim 5, comprising a second deformable pad affixed to the second arm and adapted to contact the folded proprotor blade.

7. The system of claim 6, wherein the first arm and the second arm are symmetrical about a chordwise-direction axis.

8. A system for retaining a folded proprotor blade in flight, the system comprising:
   a mounting plate;
   a first pair of opposing arms coupled to the mounting plate; and
   a deformable roller rotatably coupled to each of the first pair of opposing arms and adapted to rollably contact the folded proprotor blade.

9. The system of claim 8, wherein the deformable rollers are spring-loaded to facilitate proprotor blade retention.

10. The system of claim 9, wherein the deformable rollers are spring-loaded by the mounting plate.

11. The system of claim 8, wherein the deformable rollers comprise at least one of TEFLON, open-cell foam, closed-cell foam, rubber, and NEOPRENE.

12. The system of claim 8, comprising a second pair of opposing arms coupled to the mounting plate and to the deformable rollers at an opposite end of the deformable rollers.

13. The system of claim 12, wherein each of the first pair of opposing arms and the second pair of opposing arms comprises a tapered surface on a leading edge thereof.

14. The system of claim 8, wherein each of the first pair of opposing arms has an adjustment slot formed therein to adjust the deformable rollers in a chordwise direction.

15. A system for retaining a folded proprotor blade in flight, the system comprising:
   a mounting plate;
   a first arm coupled to at least one of the mounting plate at a first acute angle relative to the mounting plate;
   a second arm coupled to at least one of the mounting plate at a second acute angle relative to the mounting plate;
   a first deformable pad affixed to the first arm and adapted to contact a first side of the folded proprotor blade;
   a second deformable pad affixed to the second arm and adapted to contact a second side of the folded proprotor blade; and
   wherein the first side and the second side are on opposite sides of the folded proprotor blade in a beamwise direction.

16. The system of claim 15, wherein the first deformable pad and the second deformable pad are preloaded to facilitate proprotor blade retention.

17. The system of claim 15, wherein the first deformable pad and the second deformable pad are contoured to mate with the folded proprotor blade.

18. The system of claim 15, wherein the first deformable pad and the second deformable pad comprise at least one of TEFLON, open-cell foam, closed-cell foam, rubber, and NEOPRENE.

19. The system of claim 15, wherein each of the first arm and the second arm has an adjustment slot formed therein to adjust the first deformable pad and the second deformable pad in a chordwise direction.

20. The system of claim 15, wherein the first acute angle is different from the second acute angle.

\* \* \* \* \*